US 6,609,969 B1

(12) United States Patent
Luciano et al.

(10) Patent No.: US 6,609,969 B1
(45) Date of Patent: Aug. 26, 2003

(54) APPARATUS AND METHOD FOR DISPENSING OF AWARDS

(75) Inventors: Robert A. Luciano, Reno, NV (US); Michael Souza, Reno, NV (US)

(73) Assignee: Sierra Design Group, Reno, NV (US)

( * ) Notice: Subject to any disclaimer, the term of this patent is extended or adjusted under 35 U.S.C. 154(b) by 0 days.

(21) Appl. No.: 09/660,823

(22) Filed: Sep. 13, 2000

Related U.S. Application Data

(60) Provisional application No. 60/153,765, filed on Sep. 13, 1999.

(51) Int. Cl.$^7$ .................................................. A63F 13/08
(52) U.S. Cl. .................... 463/16; 273/138.1; 273/138.2; 273/139; 221/2; 221/6; 221/7; 221/8; 221/131; 221/154; 221/155
(58) Field of Search ........................... 273/448, 143 R, 273/138.1, 138.2, 139; 463/16, 17, 18, 19, 20, 25, 26, 27, 28; 221/2, 6–8, 131, 154–155

(56) References Cited

U.S. PATENT DOCUMENTS

| | | | |
|---|---|---|---|
| 988,570 A | * | 4/1911 | Hassmann .................... 221/152 |
| 4,869,500 A | * | 9/1989 | Williams |
| 5,120,060 A | * | 6/1992 | Parker et al. |
| 5,207,784 A | * | 5/1993 | Schwartzendruber .......... 221/6 |
| 5,290,033 A | * | 3/1994 | Bittner et al. |
| 5,310,184 A | | 5/1994 | Grist |
| 5,344,199 A | * | 9/1994 | Carstens et al. |
| 5,397,125 A | | 3/1995 | Adams |
| 5,397,134 A | * | 3/1995 | Fishman et al. |
| 5,402,911 A | | 4/1995 | Noell |
| 5,551,692 A | | 9/1996 | Pettit et al. |
| 5,629,981 A | | 5/1997 | Nerlikar |
| 5,816,918 A | | 10/1998 | Kelly et al. |
| 5,819,981 A | * | 10/1998 | Cox ................................ 221/2 |
| 5,848,935 A | | 12/1998 | Noell et al. |
| 6,007,426 A | * | 12/1999 | Kelly et al. .................... 463/16 |
| 6,015,344 A | | 1/2000 | Kelly et al. |
| 6,089,978 A | * | 7/2000 | Adams |
| 6,110,042 A | * | 8/2000 | Walker et al. |
| 6,131,399 A | * | 10/2000 | Hall ........................ 221/150 R |
| 6,152,447 A | * | 11/2000 | Stanley |
| 6,204,763 B1 | * | 3/2001 | Sone .............................. 221/2 |
| 6,325,294 B2 | * | 12/2001 | Tuttle et al. ................. 235/492 |

OTHER PUBLICATIONS

Fey, Marshall, Slot Machines—A Pictorial History of the First 100 years, 1997, 5th, pp. 4–5, and 8.*

* cited by examiner

Primary Examiner—Valencia Martin-Wallace
Assistant Examiner—Scott E. Jones
(74) Attorney, Agent, or Firm—Ryan A. Heck; Ian F. Burns & Associates

(57) ABSTRACT

A device for dispensing awards includes a housing having a set of compartments, the contents of which are visible from the outside. Each compartment contains a small but valuable award, such as a diamond. The housing is part of, or connected to, a gaming machine. When a player wins a game which entitles the player to select a tangible award, the device signals this fact to the player. The player then selects a compartment by pressing a input device located on the housing. An attendant opens an external door, and inserts an electronic key into a receptacle associated with the selected compartment, and enters a required code into the key. The compartment then opens, and the player obtains the award. The device provides enhanced security, because the compartment will not open unless the player has won the required game and has pressed the input device, and the attendant has properly opened the external door and has entered the correct code with the electronic key. The device also includes an inventory control system which preferably uses an RFID apparatus for monitoring the contents of each compartment, and for keeping records of an inventory of awards.

4 Claims, 8 Drawing Sheets

APPARATUS AND METHOD FOR DISPENSING OF AWARDS

CROSS REFERENCES TO RELATED APPLICATIONS

This application claims priority of U.S. provisional patent application No. 60/153,765, filed on Sep. 13, 1999.

BACKGROUND OF THE INVENTION

1. Field of Invention

The present invention relates to the field of gaming, and provides a method and apparatus for dispensing of awards.

2. Description of Related Art

There are many kinds of gaming machines in current use. Such machines include slot machines, either mechanical or electronic, video poker machines, and many other kinds of mechanical, electrical, and electronic machines which enable players to play games of chance. In all cases, these machines provide awards in only limited ways. It is, of course, possible for a machine to dispense an award of coins directly to the player, as is commonly done in the case of slot machines and the like. Other electronic gaming machines include built-in printers, which provide a winning player with a ticket, or other printed material, which can be redeemed for money at a cashier's window. In all of these cases, the award is in the form of money, not some other tangible item of value. Depending on the design of the gaming machine, the player may see a display of a dollar amount that can be won with the machine. But for gaming machines of the prior art, the awarding of non-monetary prizes has not been considered feasible due to requirements of security and inventory control.

The entertainment value of some games may be substantially enhanced when the player has the opportunity to view the actual award that can be won. Moreover, some kinds of valuable tangible awards occupy very little space, such as diamonds, jewelry, watches, tickets to popular sporting events, keys to an automobile, and others. However, placing awards of this kind in a display case is problematic, because of the need for security. In order to display an award of this kind continuously to players, one must have a mechanism that assures that neither players nor gaming personnel will be able to gain access to such awards without proper authorization. Also, it is important to have a mechanism for automatically monitoring an inventory of awards, both for purposes of maintaining security of the awards, and to be sure that the gaming machine is properly stocked at all times.

The present invention provides a method and apparatus which makes it feasible to display and dispense actual, non-monetary awards which can be won at a gaming machine. The invention provides multiple levels of security which greatly reduce the chance of theft by players or by employees of the gaming establishment.

SUMMARY OF THE INVENTION

The apparatus of the present invention includes a vault, which may be integrated with a gaming machine, or which may be a separate unit controlled by the gaming machine. The vault includes a plurality of compartments, in which various tangible awards are displayed. The compartments have exterior walls comprising transparent windows, allowing the contents of the compartments to be seen from the outside, while still preventing unauthorized access. In the preferred embodiment, the compartments are further closed off from the outside by a locked exterior door which encloses all of the compartments, but which also contains a single window permitting a player to view the contents of all of the compartments.

When, in playing the game, a player wins a prize which qualifies the player for one of the tangible awards, the system so notifies the player, by an appropriate display of lights and/or appropriate sounds. In the preferred embodiment, at least the following three events must occur to enable the player to retrieve an award. First, the player must select one of the awards, such as by pressing an input device. Second, an attendant must unlock the exterior door to enable access to the compartments. This is preferably done by verifying the identity of the attendant using a radio frequency identification badge or card worn by the attendant. A device is provided on the vault that interrogates the badge and receives an identifying signal. Third, the attendant may open the selected compartment using a key, the lock on the key being enabled by the vault and/or by a central computer.

The system also includes inventory control means for monitoring the contents of the compartments and maintaining records of which awards have been dispensed to players. In the preferred embodiment, the inventory control means comprises an RF identification (RFID) system, wherein each award includes a small tag containing an electronic circuit which generates an RF signal in response to wireless interrogation from a transmitter. By continuously interrogating the circuits on the tags, and monitoring the responses received, the system can continuously verify that there has been no breach of security, and can also generate reports concerning the status of an inventory of awards.

The invention therefore has a primary object of providing an apparatus and method for dispensing of tangible awards to players of a game.

The invention has the further object of providing a secure system for storing, displaying, and dispensing of valuable, tangible awards.

The invention has the further object of providing a method and apparatus which enhances the entertainment value of a gaming machine, by making it feasible to display and dispense tangible awards to winners of games.

The invention has the further object of providing a gaming method and apparatus which allow a winning player to choose a particular award to be dispensed.

The invention has the further object of providing a device for dispensing tangible awards, which device can be integrated with a gaming machine.

The invention has the further object of providing a device as described above, wherein the device will not permit access to a tangible award unless a player has won a game which entitles the player to that award.

The invention has the further object of providing a device for storing and dispensing of tangible awards, wherein the device has automated means for monitoring an inventory of awards.

The reader skilled in the art will recognize other objects and advantages of the present invention, from a reading of the following brief description of the drawings, the detailed description of the invention, and the appended claims.

DETAILED DESCRIPTION OF THE PREFERRED EMBODIMENT

The present invention includes a vault which stores, displays, and dispenses tangible awards to winners of games played with gaming machines. The vault of the present invention is intended to sit on top of, or to be formed integrally with, a gaming machine. FIGS. 1–4 illustrate the vault of the present invention, and FIG. 5 shows a typical gaming machine equipped with such a vault.

Figure 1:
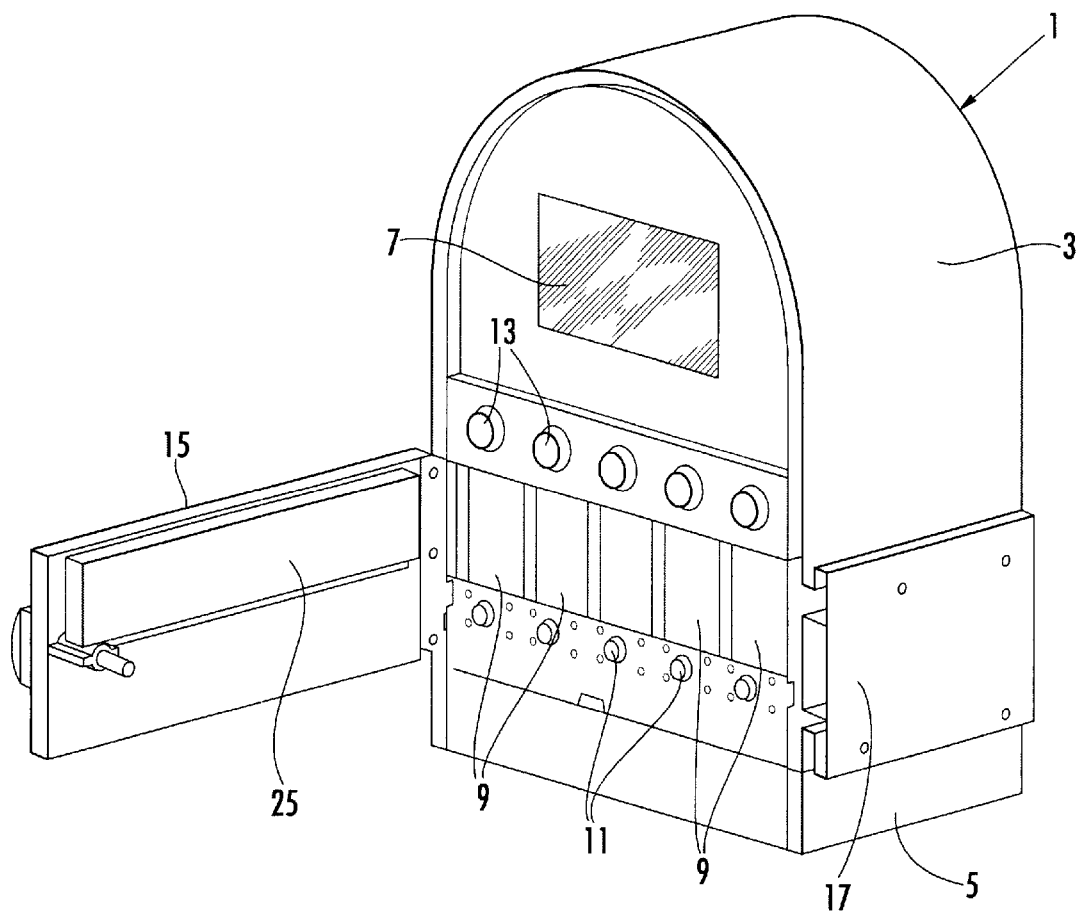
FIG. 1 provides a perspective view of the dispensing device of the present invention, showing its external door opened.

As shown in FIG. 1, vault 1 includes a housing having a curved top portion 3, and a generally flat bottom portion 5 enabling the vault to be mounted on a conventional gaming machine. The vault includes an area 7 for display of indicia relating to the game. Compartments 9 are used to hold the tangible awards. Each compartment is sealed off by a transparent partition, preferably made of hard plastic, which permits the contents of the compartment to be viewed from the outside, but which prevents access to the compartment by unauthorized persons. Under each compartment is a receptacle 11 for receiving input from an electronic key. The various receptacles can be considered to represent the plurality of electronic locks which are disposed within the housing, each electronic lock being associated with one of the respective compartments. Above each compartment is an input device 13, such as a pushbutton or touchscreen, which a winning player can actuate, to indicate his or her choice of award. Compartments 9 are normally further enclosed by external door 15 which is locked by locking mechanism 17.

Figure 2:
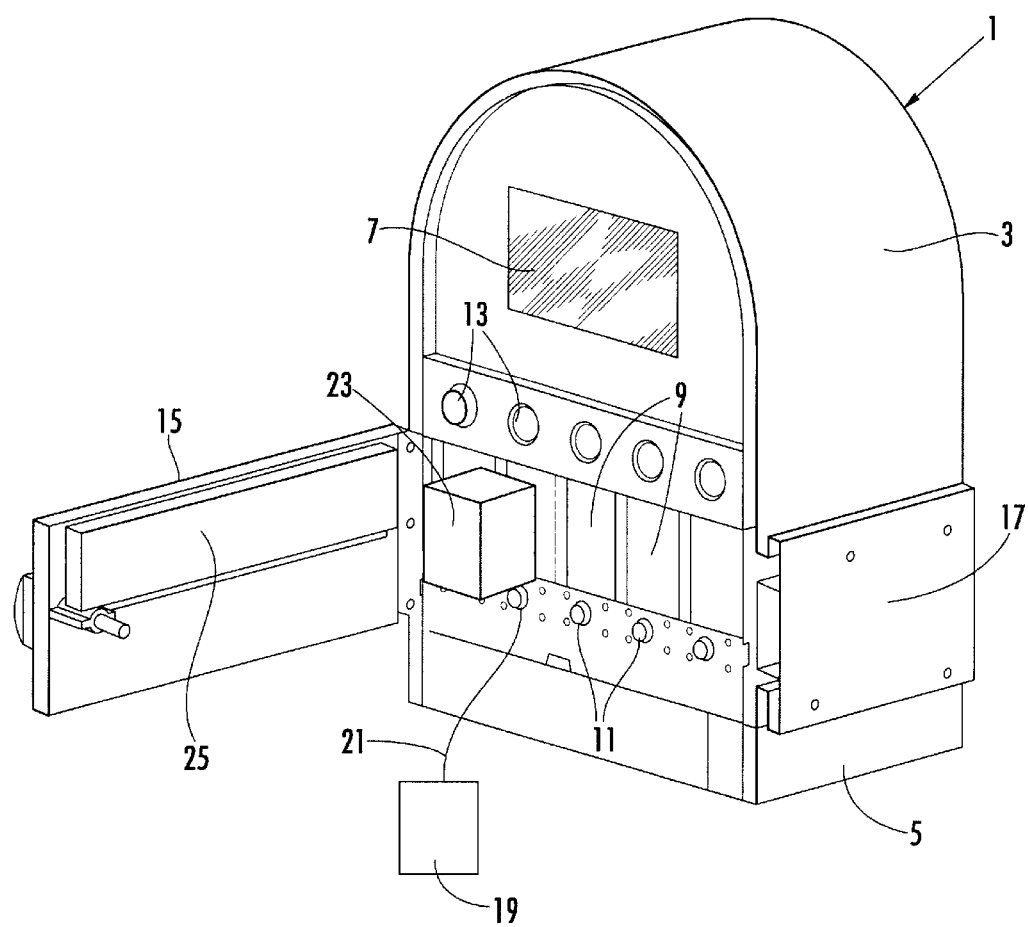
FIG. 2 provides a perspective view similar to FIG. 1, showing a box containing an award coming out of a compartment of the dispensing device, and showing, in block form, an electronic key being connected to a receptacle located below the compartment.

FIG. 2 shows the vault of the present invention, in a view similar to that of FIG. 1, except that FIG. 2 also shows box 23 coming out of one of the compartments 9. The box contains a tangible award, to be described later. FIG. 2 also shows, in block form, electronic key 19, which is shown to be temporarily connected, by cable 21, to one of the receptacles 11.

Figure 3:
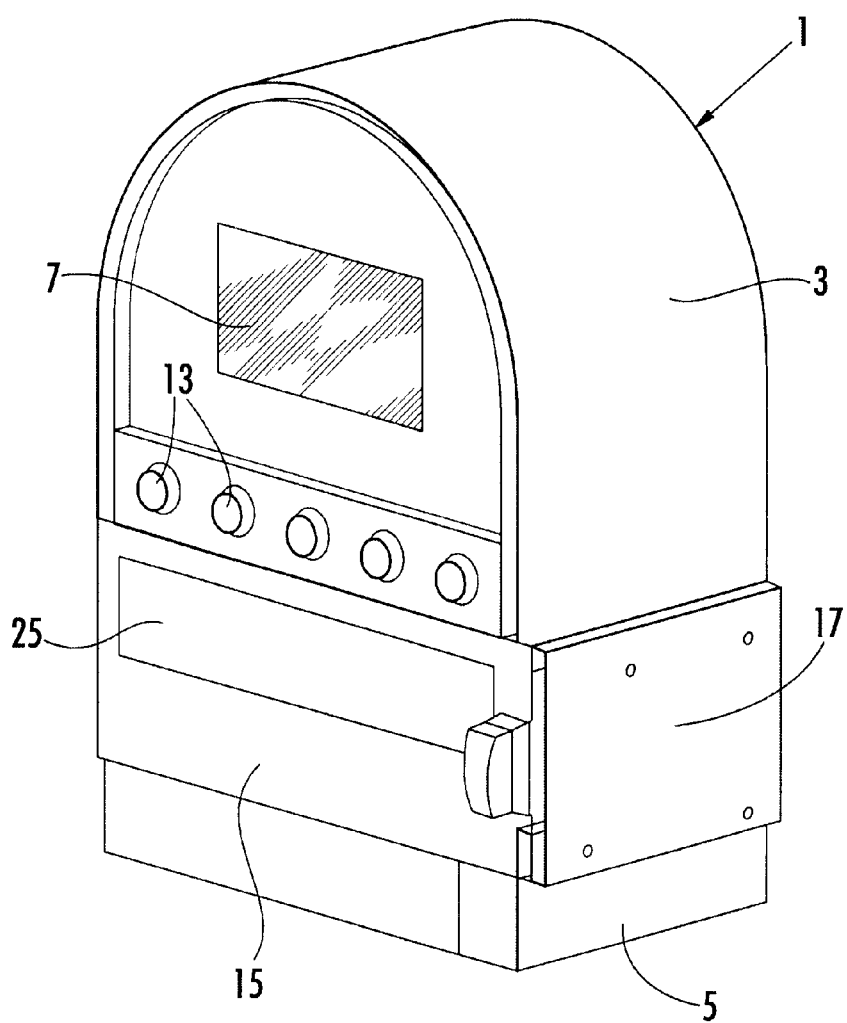
FIG. 3 provides a perspective view, similar to FIGS. 1 and 2, showing the dispensing device with its external door locked.

FIG. 3 provides a perspective view, similar to those of FIGS. 1 and 2, but showing the external door 15 in the closed and locked position. Door 15 includes window 25 which permits viewing of the contents of all of the compartments, from the outside, when the external door is closed and locked. Like the transparent partitions of the compartments, the window is preferably made of a transparent plastic material which is also sufficiently strong to prevent unauthorized access to the compartments.

Figure 4:
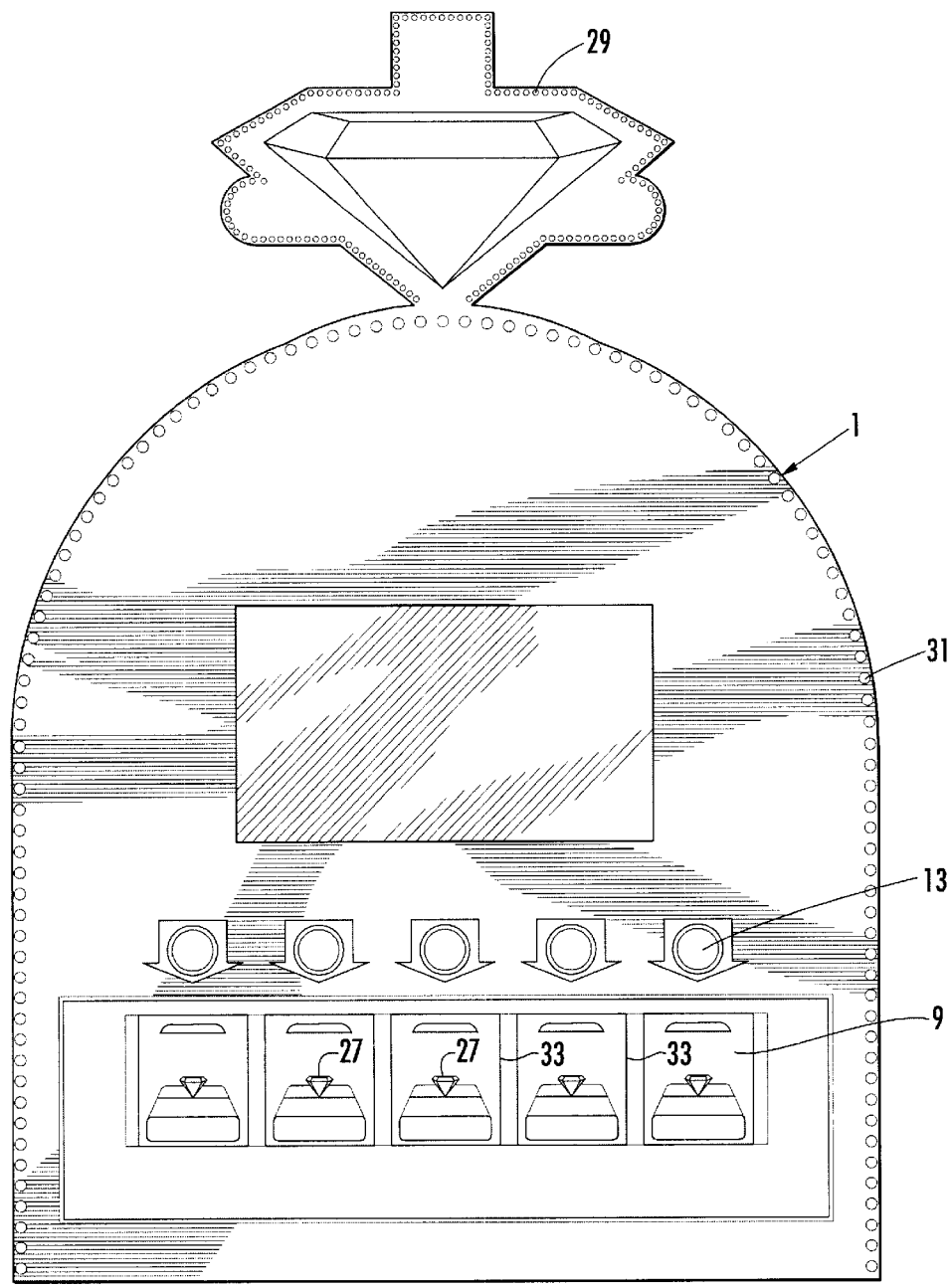
FIG. 4 provides a front elevational view of a preferred embodiment of the dispensing device of the present invention.
Figure 5:
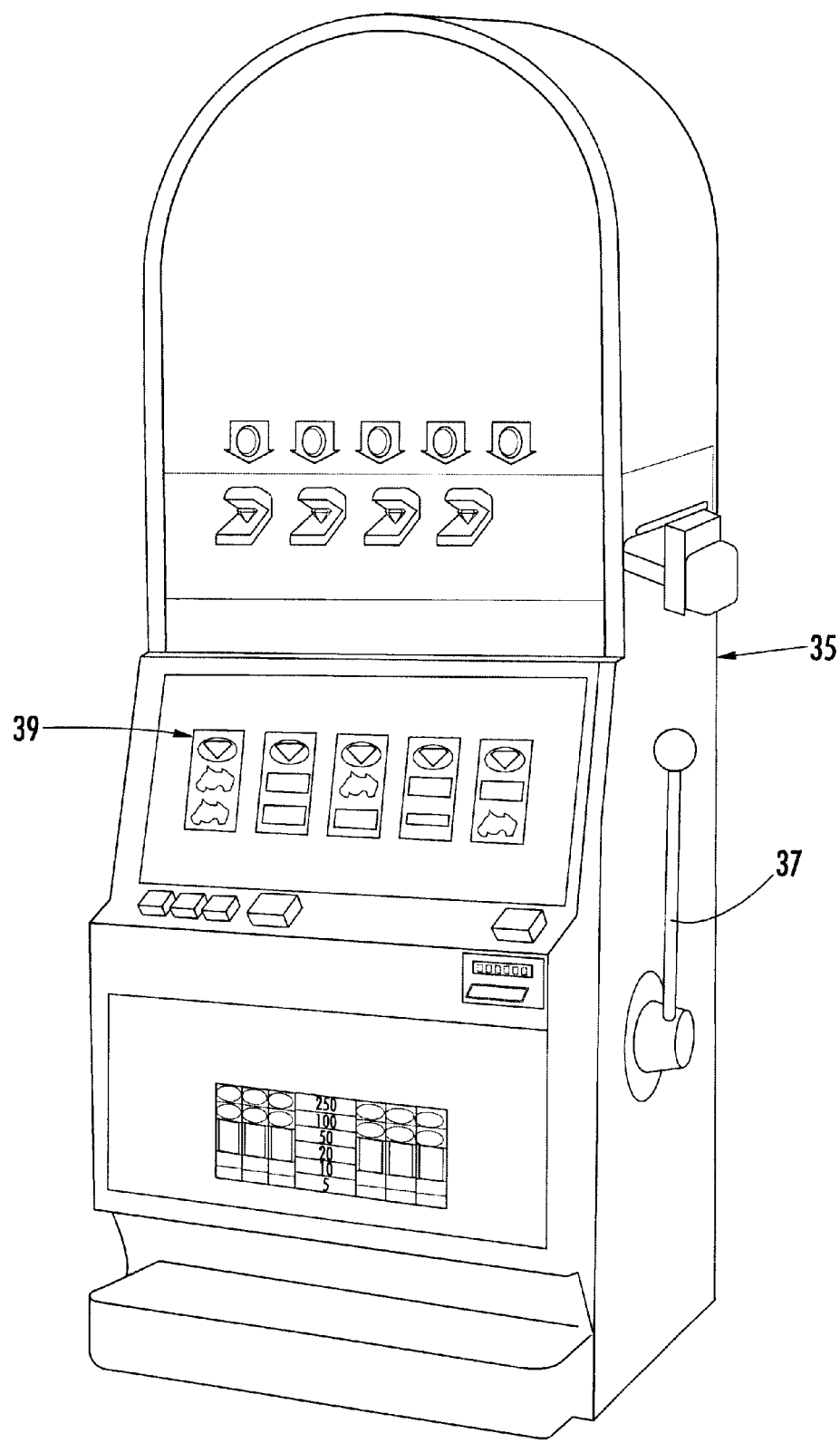
FIG. 5 provides a perspective view of a gaming machine equipped with the dispensing device of the present invention.

FIG. 4 provides a front elevational view of one preferred embodiment of the vault 1 of the present invention. As shown in FIG. 4, the vault includes a plurality of compartments 9, each of which holds an award 27, which in the embodiment of FIG. 4 is a diamond. Each diamond is mounted in a suitable case, such as a type of case that would be on display in a jewelry store, and the entire case is held within the compartment. Each compartment includes a transparent partition, the borders of which are visible in the figure, the partitions being identified by reference numerals 33. The compartments are further secured by an external door, of the type shown in FIGS. 1–3, and having its own transparent window which allows observation of all of the compartments.

At the top of the vault is a "candle" 29, which is a specially shaped electric light used to signal that a player has won a major award. In the example of FIG. 4, the candle includes a representation of a diamond, because diamonds are the awards held in the compartments, and diamonds constitute the "theme" of this particular machine. The candle may take other forms, within the scope of the invention.

The candle may include various combinations of lights, including one or more lights within the representation of the diamond, and perimeter lights surrounding the diamond. Also, there are perimeter lights 31 disposed around the main body of the vault itself. These lights can be programmed to flash during normal play, and/or when a player has won a major award. The pattern of flashing can be made to vary to suit the situation. For example, the pattern of lights could be programmed to flash more rapidly when the player has just won a prize.

FIG. 5 shows the invention as used in conjunction with a slot machine. Slot machine 35 includes conventional elements, such as display symbols 39, and handle 37, as well as the vault of the type described above, located above the display symbols. In this example also, the awards stored in the compartments of the vault are diamonds.

In FIG. 5, the vault is an integral part of the overall gaming machine. It is also possible to form the vault separately, and to attach it to the gaming machine, or to operate the vault remotely from the gaming machine. The latter alternatives are within the scope of the present invention.

In the more general case, the awards need not be diamonds, but can be any awards that can be conveniently stored and displayed in small compartments. Examples of other kinds of awards include rings, watches, other pieces of jewelry, rare coins or stamps, or tickets to popular sporting events. Still other awards could include small, tangible but symbolic awards, such as keys to an automobile. All such awards are intended to be included within the scope of the present invention.

Note also that in the illustrated embodiment, all compartments contain the same type of award. That is, in FIGS. 4 and 5, the compartments all contain the same kind of diamond. In the more general case, it is not necessary that the awards in each compartment be the same. Providing a mixed selection of awards can enhance the entertainment value of the game, and can also enable the system to cater to the desires of a larger percentage of the gaming public.

A general description of the method of use of the present invention is as follows. First, it is assumed that the player has won an award while playing a game on a gaming machine. In the preferred embodiment, the award is a special award, i.e. one which is awarded comparatively rarely. However, the invention is not necessarily limited to use with rarely-won awards.

When the player has won a game which entitles the player to receive a tangible award from the vault, the system so notifies the player. Such notification may include the playing of a "happy" tune on an audio system connected to, or forming part of, the vault, and/or the flashing of lights in an unusual pattern. If the gaming machine includes a "candle", the candle can be activated to summon an attendant who will be needed to help the player retrieve the award.

The player then must choose an award from one of the compartments. The player indicates this choice by pressing one of the input devices. Even if the compartments all contain the same award, the player must still choose one. In the more general case, in which different awards are in different compartments, the player's choice may have more significance. But whether or not the awards are the same or different, the device will work in essentially the same way.

In the preferred embodiment, pressing an input device is a necessary, but not sufficient, condition to open the compartment associated with that input device. Additional steps, described below, must be performed before the contents of the selected compartment can be retrieved. Also, in the preferred embodiment, for reasons of security, when a given input device is pressed, the system automatically disables the other input devices, so that it is not possible to open any compartment other than the one selected by the player.

Meanwhile, an attendant arrives, summoned by the sights and/or sounds of a winning machine. The attendant carries both a master key which can unlock the external door, and an electronic key. The electronic key is programmed to open a given compartment when an appropriate code, associated with the selected compartment, is entered into the electronic key. The attendant connects the electronic key to the receptacle associated with the compartment selected by the player, and enters a code on a keypad on the electronic key. A specific code has been previously assigned to each compartment, and the attendant must enter the correct code pertaining to the compartment selected by the player.

If the code entered by the attendant is correct, the compartment opens, and the contents of the compartment can be removed. At this point, the attendant can lock the compartment, leaving it empty until another award can be placed therein. Alternatively, the attendant can immediately refill the compartment, and then lock it. It is also possible to leave the compartment empty temporarily, and not to lock the compartment.

The electronic lock described above is commercially available. For example, one could use an electronic lock sold by Medeco, of Salem, Va., under the trademark INSITE VLS, the latter product being covered by U.S. Pat. No. 5,140,317, the disclosure of which is hereby incorporated by reference. Other equivalent products could be used instead.

The method of the present invention also includes an inventory control function. To perform inventory control, it is necessary to provide the apparatus with a means for determining at least the presence or absence of an object in a compartment. Such means could be as simple as a microswitch that is actuated only when an award is present, the microswitch being connected to appropriate circuitry for determining the condition (open or closed) of the switch. Alternatively, one could use a proximity sensor, such as a non-contacting capacitive sensor which is available from Stedham Electronics Corp., of Reno, Nev.

In a more preferable alternative, one can use an RFID (radio frequency identification) system. In the latter system, a tag attached to the award includes circuitry comprising an RF transmitter. An RFID tag reader unit comprises a transceiver, or a separate transmitter and receiver, preferably housed together. The tag reader unit sends an RF signal which interrogates the tag. The transmitter on the tag responds with an encoded signal in reply. This encoded signal is then decoded by the receiver portion of the reader unit. The encoded signal transmitted by the tag can include information relating to the nature of the object, and is intended to include information which is unique to the object to which the tag is affixed.

The advantage of an RFID system is that not only can the system detect the presence or absence of an object in a compartment, but it can also determine other information about the object, based on information encoded in the tag and transmitted to the reader.

Thus, using the inventory control means discussed above, the system can keep track of how many awards are still in inventory, how many are located in the compartments, and how many have been won and distributed to players. The RFID system is especially useful in cases where different awards are displayed in the various compartments, because the system can know exactly what kind of award is located in which compartment. The inventory control system therefore comprises not only a means for monitoring inventory, but also as a means for enhancing security, as it can be programmed to provide early warning if an award is improperly removed from a compartment.

Figure 6:
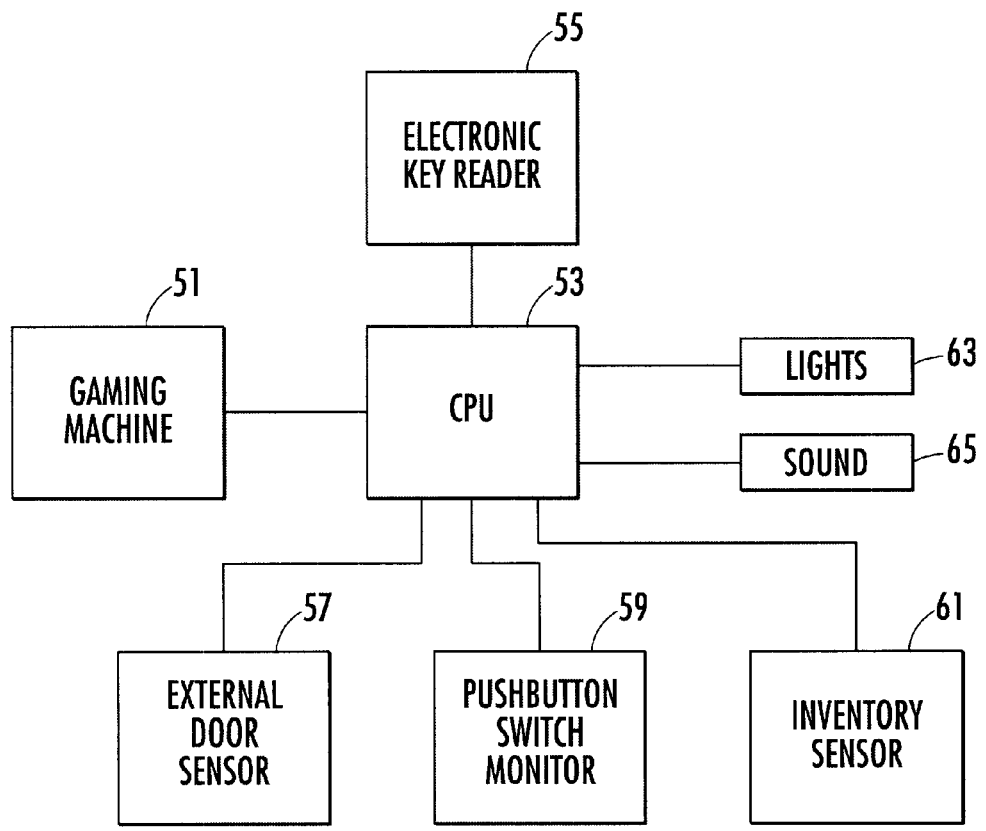
FIG. 6 provides a block diagram of the major components of the device of the present invention.

FIG. 6 provides a block diagram of the major components of the apparatus of the present invention. The primary element of the apparatus is central processor unit (CPU) 53, which is preferably a programmed computer or microprocessor, or its equivalent. The CPU is coupled to a conventional gaming machine 51, which machine could be a slot machine, a video poker machine, or any other gaming machine capable of signaling, to the CPU, that a player has won the right to select an award from one of the compartments. In practice, the gaming machine may be integrated into the same housing as the vault, as shown in FIG. 5, or it may be physically separate and located some distance away. Alternatively, the vault may be connected to a plurality of gaming machines through a communication network. In this way, the vault can dispense prizes for a plurality of machines. The communication network may be any of a number of network systems that are well known in the art. In this embodiment, each gaming machine would send a signal to the vault when a player had qualified to win a prize in the vault. The vault may also be connected to a central computer that may monitor the vault and provide additional security. The central computer may verify when a player has won a prize in the vault and the central computer may enable locks the vault to allow an attendant to remove prizes from the vault.

Various peripheral components are connected to CPU 53, such that the CPU can monitor their status. These include electronic key reader 55, external door sensor 57, input device switch monitor 59, and inventory sensor 61.

The electronic key reader 55 is a conventional device which works with the electronic key described above. One accesses the electronic key reader by attaching the electronic key, by a suitable cable, to one of the receptacles located under one of the compartments, as described above and illustrated, for example, in FIG. 2. The electronic lock used in the present invention is programmed to open only when the correct code is received from the electronic key, and when the player has won the required game and has selected the appropriate compartment.

The external door sensor 57 is any device which can monitor the status of the external door. This sensor could be a simple as a conventional mechanical switch, or it could be an electronic sensor. Sensor 57 is preferably capable of generating a signal indicating that the external door is open or closed.

The input device switch monitor 59 monitors the condition of the various input devices. The functions of monitor 59 could be integrated into the CPU, provided that the CPU contains appropriate ports for receiving signals from each of the input devices, so that the CPU can determine the status of each button. The CPU is preferably programmed to enable a lock to open only when the required game has been won, and when the corresponding input device is pressed. It can also be programmed to prevent any lock from opening if an incorrect input device is pressed, or if more than one input device is pressed.

The inventory sensor 61 is a device for monitoring the contents of the compartments. As noted above, the inventory sensor could be a simple switch or microswitch which is actuated when a box is in a compartment, and not actuated when a box is not present. It could instead be a noncontacting proximity sensor, such as a capacitive sensor, capable of determining the presence or absence of an object in the compartment. More preferably, the inventory sensor is an RFID system, which requires that a tag be affixed to each award, the tag having circuitry capable of transmitting an encoded reply in response to an interrogation signal. The invention is not limited by the type of sensor used.

The CPU is also connected to light display generator 63 and audio generator 65. The light display generator 63 comprises circuitry for controlling the lights on the periphery of the gaming device and/or on the periphery of the vault, and/or the lights on top of the vault. The audio generator 65 controls the playing of a musical tune, preferably a happy tune, which accompanies the winning of an award by a player. Both the light display and the audio generator serve to enhance the entertainment value of the device, by announcing a player's good luck in winning a major award, and by broadcasting this event to other customers in the vicinity of the device. The light display and audio generator also assist attendants in locating the machine which is the site of the winning play. Both, either, or neither of the light display and audio generator could be used, within the scope of the invention.

Figure 7:
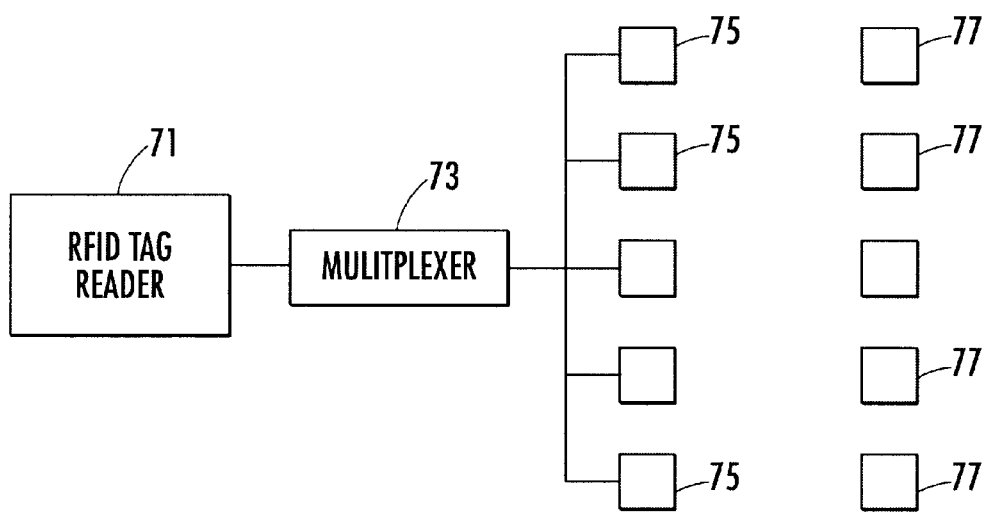
FIG. 7 provides a block diagram showing the preferred form of an RF identification (RFID) system which is used in the present invention.

FIG. 7 provides a block diagram showing an arrangement of an RFID system used in the present invention. RFID tag reader 71 includes a transmitter which sends an interrogation signal to the RFID tags, and a receiver which receives signals sent in reply by the various tags. The transmitter and receiver portions of reader 71 may be included in the same unit, and in fact may be provided on the same electronic chip. Multiplexer 73 performs a time-division of the transmitted signal, such that the signal will be transmitted by only one of the various antennas 75 at one time, each antenna being associated with one of the RFID tags. RFID tags 77 are positioned to receive from, and transmit to, the respective antennas 75. The multiplexer enables one tag reader to be used for the entire system, even though there are a plurality of RFID tags. Appropriate circuitry in the multiplexer decodes the received signal, so that the tag reader will know which tag transmitted a particular reply, based on the time at which that reply was received. Such multiplexing technology is within the level of ordinary skill of persons skilled in the electronic arts.

Figure 8:
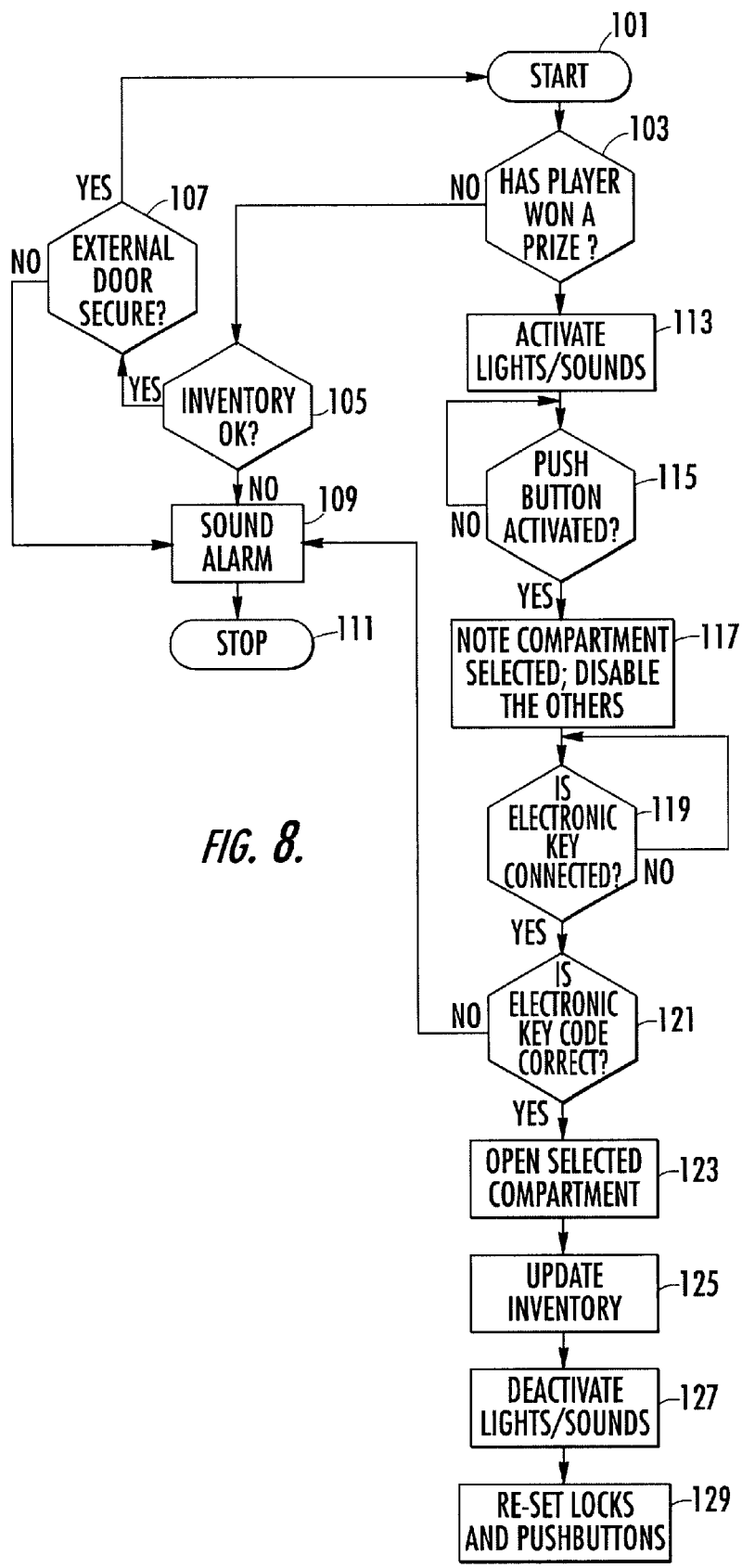
FIG. 8 provides a flow chart illustrating the major steps of the method of the present invention.

FIG. 8 provides a flow chart illustrating the major steps in the programming of the CPU according to one embodiment of the present invention. The program begins in block 101. The program then determines whether a player has won a game which would entitle him or her to select an award displayed in the vault. Normally, the answer would be no. In this case, the system would proceed to test 105, which checks the status of the inventory sensor. If the condition of the inventory is normal, the system proceeds to test 107, which checks the condition of the external door. If either of these tests indicate an abnormal condition, the system sounds an alarm, in block 109, and stops, in block 111.

For the vast majority of iterations, the player will not have won a game, and there will be no abnormal condition. The program will therefore execute the loop described above, until one of the above conditions changes.

Assume now that the player has won the right to select an award held in the vault. The system activates the lights and/or sounds associated with the winning of the game, in block 113. The system then waits for a input device to be pressed, in test 115. When an input device is activated, the system, in block 117, notes the compartment selected, and sets the locks on the non-selected compartments so that they cannot open.

Next, in test 119, the system waits for input from an electronic key which is to be connected to the electronic lock associated with the selected compartment. If the electronic key is not connected to the correct compartment, or if the code entered into the key is not correct, the system will sound an alarm and stop, according to test 121. If the electronic key is connected correctly, and the entered code is also correct, the system opens the lock associated with the selected compartment, in block 123. In block 125, the system updates its inventory records, according to the award that is removed. It is also possible that the attendant may replace the inventory at this point, in which case block 125 also includes updating the inventory to reflect the award placed in the vault. The system then deactivates the lights and/or sounds, in block 127, and resets the lock and input device signals, so that it is ready to detect future activation of these. The program then returns to block 101.

The present invention also comprises a method for awarding time sensitive prizes. The value of some prizes is dependent on time. For example, tickets to a boxing match have no value after the boxing match has occurred. To avoid having this kind of prize sit in the vault until they are worthless, the vault or the associated gaming machine would increase the probability of winning the prize the closer the time is to a critical date. For example, the probability of winning boxing tickets may be 0.001 a month before the event while the probability of winning the boxing tickets may be 0.01 one day before the event. It is well with the ability of game designers to program gaming machines to use different probabilities depending on the date.

There are many ways to vary the program illustrated in FIG. 8 and described above. Various security tests could be performed almost simultaneously, and repeatedly, at different points in the logical flow of the program. For example, one could check the integrity of the external door and of the inventory, at different locations in the program. The arrangement of FIG. 8 comprises only one example, and is not intended to limit the invention to a particular method.

In the examples given above, the operation of the external door lock is independent of the operation of the gaming machine and the vault. The attendant simply uses a conventional key to open the door, to allow access to the compartments when they are opened. However, it is also possible to control the external door lock according to the status of the gaming machine. That is, the system could include means for preventing the external lock from opening unless the player wins a game resulting in one of the awards displayed in the vault. In the latter case, the program would need to test for the status of the external lock in the steps which are executed following a "YES" answer in test 103. It is also possible to make the external lock an electronic lock.

In the preferred embodiment, the vault is in communication with a central computer. The central computer holds a database attendants authorized to open the vault. When a player wins a prize in the vault, an attendant identifies himself to the central computer. In the preferred embodiment, this is accomplished with an RFID badge carried by the attendant and a receiver on the vault. Identifying information on the RFID badge is transmitted to the central computer and the central computer responds, if appropriate, with a signal to the vault that authorizes the attendant to open one or more locks on the vault. The central computer may authorize an attendant to authorize the vault when a player has won a prize or it may do so when the vault is being restocked. In the latter case, the database in the central computer may only allow an attendant to open the vault during specific times.

The invention can be modified in still further ways. In the preferred embodiments described above, there are at least three levels of security, namely the external door lock, the input devices operated by the player upon winning a game, and the electronic keys into which an attendant enters a necessary code. However, some of these levels could be omitted, if it is desired to simplify the system and/or to reduce its cost. For example, one could provide a vault in which the only conditions needed to open a compartment are that the player win a game and that the player select a particular input device. In another example, one could provide a vault which includes all of the above, plus the requirement of the use of the electronic key. The latter system would therefore omit the external door. These alternatives are not as secure as the preferred embodiment, but should nevertheless be considered within the scope of the present invention.

The number of compartments can be varied. Indeed, it is possible to provide a device with only one compartment, containing only one award at one time. The latter arrangement might be used if it desired to award an extremely special prize.

The present invention can be modified further, in other ways. These modifications, which will be apparent to the reader skilled in the art, should be considered within the spirit and scope of the following claims.

CONCLUSION

Although the description above contains many specifications, these should not be construed as limiting the scope of the invention but as merely providing illustrations of some of presently preferred embodiments of this invention. Thus, the scope of the invention should be determined by the appended claims and their legal equivalents rather than by the examples given.

What is claimed is:

1. An apparatus for dispensing non-monetary prizes to a player playing a game, the apparatus comprising:
    a) a vault comprising an external door, the external door being accessible by using an external door lock, the vault further comprising a plurality of compartments, each compartment having a window enabling contents of the compartment to be seen from outside the vault;
    b) each compartment being associated with an input device disposed on the vault;
    c) each compartment being secured by an electronic lock;
    d) an electronic key programmed with a specific code assigned to each compartment;
    e) a master key to unlock the external door lock;
    f) a gaming mechanism capable of enabling a player to play a game, the gaming mechanism being capable of signaling that the player has won a prize, wherein the electronic lock associated with a given compartment is adapted to open when the player has won a game and has actuated the input device associated with the given compartment; and
    g) a microprocessor and an inventory monitoring device, the inventory monitoring device being located within the vault and being capable of detecting presence of objects in the compartments, the inventory monitoring device being connected to the microprocessor such that the inventory monitoring device can transmit, to the microprocessor, information about objects in the compartments.

2. The apparatus of claim 1, further comprising an external door for closing off said compartments, the external door having a window permitting viewing of said compartments when the external door is closed, the external door being secured by an external lock.

3. The apparatus of claim 1, wherein the inventory monitoring device comprises a proximity sensor.

4. The apparatus of claim 1, wherein the inventory monitoring device comprises an RFID transmitter and reader system.

* * * * *